(12) United States Patent
Gill et al.

(10) Patent No.: US 7,409,163 B2
(45) Date of Patent: Aug. 5, 2008

(54) METHOD AND APPARATUS FOR OPTICAL SIGNAL TRANSMISSION

(75) Inventors: Douglas M Gill, South Orange, NJ (US); Xiang Liu, Marlboro, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 626 days.

(21) Appl. No.: 10/881,236

(22) Filed: Jun. 30, 2004

(65) Prior Publication Data

US 2006/0002714 A1    Jan. 5, 2006

(51) Int. Cl.
*H04B 10/00* (2006.01)
*H04B 10/12* (2006.01)
*H04B 10/04* (2006.01)

(52) U.S. Cl. ............... 398/159; 398/185; 398/193; 398/147

(58) Field of Classification Search .......... 398/81, 398/147, 150, 159, 185, 193, 198
See application file for complete search history.

(56) References Cited

U.S. PATENT DOCUMENTS

| 4,878,726 A * | 11/1989 | Fatehi ..................... 385/16 |
| 5,867,534 A | 2/1999 | Price et al. ................ 375/286 |
| 6,915,082 B2 * | 7/2005 | Yano ........................ 398/188 |
| 2001/0046077 A1 | 11/2001 | Akiyama et al. ............ 359/161 |
| 2003/0035179 A1 * | 2/2003 | May ........................ 359/161 |
| 2003/0185575 A1 | 10/2003 | Ikeuchi ..................... 398/197 |
| 2005/0025491 A1 * | 2/2005 | Oomori ..................... 398/107 |

FOREIGN PATENT DOCUMENTS

EP    1 335 509 A2    8/2003

OTHER PUBLICATIONS

U.S. Appl. No. 10/355,583, filed Jan. 31, 2003, Gill et al.
U.S. Appl. No. 10/356,203, filed Jan. 31, 2003, Gill et al.
B. Enning, "Signal Shaping for Optical Wideband Transmission Systems Using the Inherent Lowpass Behavior of Counterpropagating Optical and Electrical Signals in a LiNbO$_3$ Mach-Zehnder Modulator", *Journal of Optical Communications*, 22 (2001) 746, pp. 1-4.
M. Wichers et al., "Optical Duobinary Modulation Schemes Using A Mach-Zehnder Transmitter For Lightwave Systems", *ICTON'99*, Paper We.B.1, Jun. 9, 1999, pp. 15-18.
T. Tokle et al., "Advanced Modulation Formats In 40 Gbit/s Optical Communication Systems With 80 km Fibre Spans", *Optics Communications*, North-Holland Publishing Co., Amsterdam, NL, vol. 225, No. 1-3, Sep. 15, 2003, pp. 79-87.
V. Wongpaibool et al., "SSB Direct Detection Scheme In Duobinary Carrier-Suppressed RZ Transmission", *Electronics Letters*, vol. 39, No. 1, Jan. 9, 2003, p. 86.
V. Wongpaibool et al., "Comparison Of Alternative Carrier-Suppressed Return-to-Zero Modulation Formats", *Proceedings of SPIE, Optical Transmission Systems And Equipment For WDM Networking II*, vol. 5247, Aug. 2003, pp. 284-298.

* cited by examiner

*Primary Examiner*—Jason Chan
*Assistant Examiner*—Nathan M Curs

(57) ABSTRACT

A method and apparatus for transmission of optical signals across an optical transmission link wherein duobinary signals or inverse-data signals are transmitted when the chromatic dispersion of the transmission link is above or below a dispersion threshold, respectively, to significantly improve optical signal transmission performance.

7 Claims, 7 Drawing Sheets

METHOD AND APPARATUS FOR OPTICAL SIGNAL TRANSMISSION

CROSS-REFERENCE TO RELATED APPLICATION

This application is related to co-pending patent applications Ser. No. 10/355,583 entitled "Apparatus and Method For Duobinary Transmission", and Ser. No. 10/356,203 entitled "Duobinary Transmission System and Method", filed Jan. 30, 2003, both of which are incorporated herein by reference.

FIELD OF THE INVENTION

The present invention relates generally to optical transmission and more particularly to methods and apparatus for generating transmitting optical signals.

BACKGROUND OF THE INVENTION

Duobinary is a well-known modulation format in fiber optic communications. Optical duobinary signals typically have two to three times the chromatic dispersion tolerance of conventional binary signals as well as a high tolerance to nonlinear penalties. The increased chromatic dispersion tolerance of duobinary transmission can provide significant cost savings in optical transmission systems by removing the need for dispersion compensation modules (DCMs).

One technique for realizing transmission of optical duobinary signals is to generate a three-level modulator drive signal by filtering a differentially encoded binary NRZ data stream with an electrical low-pass filter. The filtered drive signal drives a modulator to generate the duobinary signals for transmission across a transmission link to a receiver. This technique is typically referred to as the electrical low-pass filtered (LPF) duobinary approach. An example of an optical transmission system for transmitting electrical LPF duobinary signals is shown in FIG. 1. The differential encoder shown in FIG. 1 is used to pre-code the data before the low-pass filtering so that the generated optical duobinary signal (after digitization at the receiver) is the same as the original data.

Duobinary transmission systems are potentially cost effective commercial fiber optic transport solutions, particularly for metropolitan applications. However, in transmission links with low chromatic dispersion (e.g. chromatic dispersion compensated links or links spanning relatively short distances) or with back-to-back transmission, duobinary signals can suffer a 2-4 dB optical signal-to-noise (OSNR) penalty as compared to conventional binary signals.

SUMMARY OF THE INVENTION

One aspect of the present invention involves the recognition that conventional optical duobinary signals (also referred to hereinafter as duobinary signals) have higher tolerance to amplified spontaneous emission (ASE) noise as compared to conventional binary signals when the transmission link has a chromatic dispersion above an identifiable dispersion threshold, while an inverse-data signal has higher tolerance to ASE noise as compared to duobinary signals when the transmission link has a chromatic dispersion below the dispersion threshold. Specifically, duobinary signals perform poorly when the chromatic dispersion of a transmission link is low or when there is no chromatic dispersion in the transmission link. In such cases, transmission of inverse-data signals in accordance with the invention can be used to provide high tolerance to ASE noise. (The term 'inverse-data signal', as used herein, refers to a signal having a complementary intensity profile or waveform to that of a duobinary signal. Additionally, inverse-data signals have a data content that is inverted as compared to the data content of a duobinary signal.)

In another aspect of the present invention it has been recognized that by transmitting inverse-data signals instead of duobinary signals when the chromatic dispersion of a transmission link is below a dispersion threshold, the transmission performance is significantly improved with regard to impairments from timing jitter in the drive signals, polarization-mode dispersion (PMD), and nonlinear effects.

In preferred embodiments of the present invention, apparatus and methods are provided to adaptively generate either a duobinary signal or an inverse-data signal, depending on the chromatic dispersion of a transmission link in order to optimize the transmission performance across the transmission link.

In one embodiment of an apparatus according to the invention switching between duobinary signal generation and inverse-data signal generation is achieved by controlling the bias of a modulator used to generate the signals. In an alternative embodiment, switching between transmission of a duobinary signal and an inverse-data signal is achieved using an optical 1×2 switch to switch between transmission of such signals from complementary output ports of a dual output modulator.

DETAILED DESCRIPTION OF THE INVENTION

Figure 1:
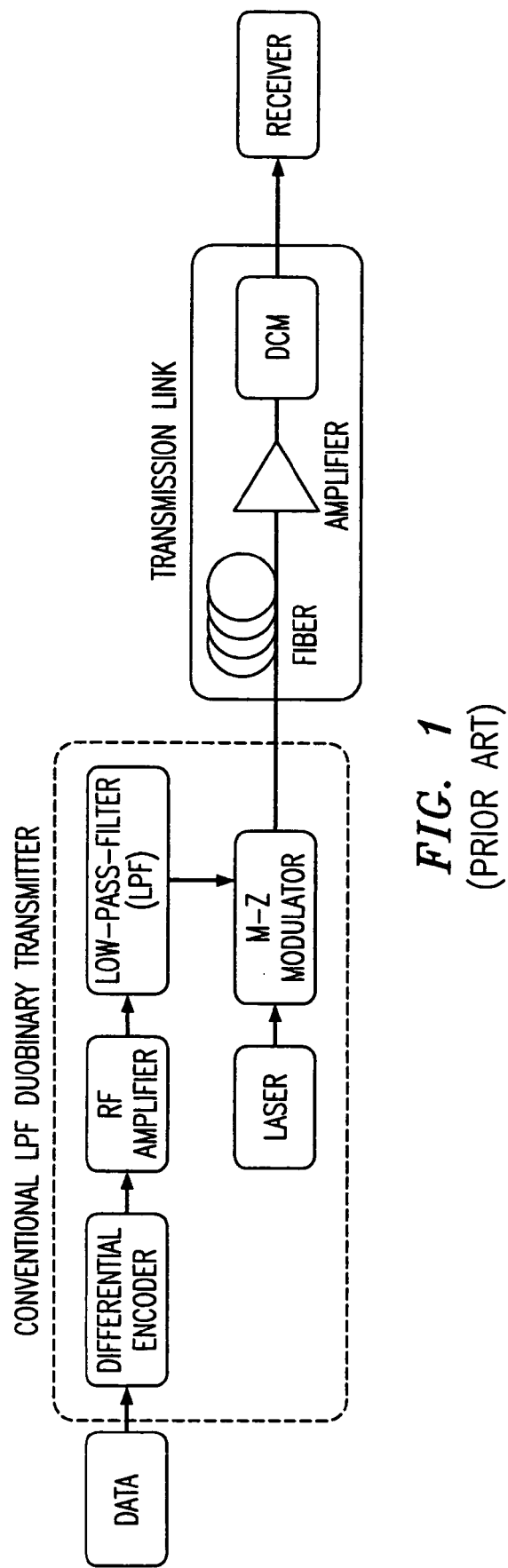
FIG. 1 is a schematic diagram of a prior art electrical LPF duobinary transmitter and transmission link.
Figure 2:
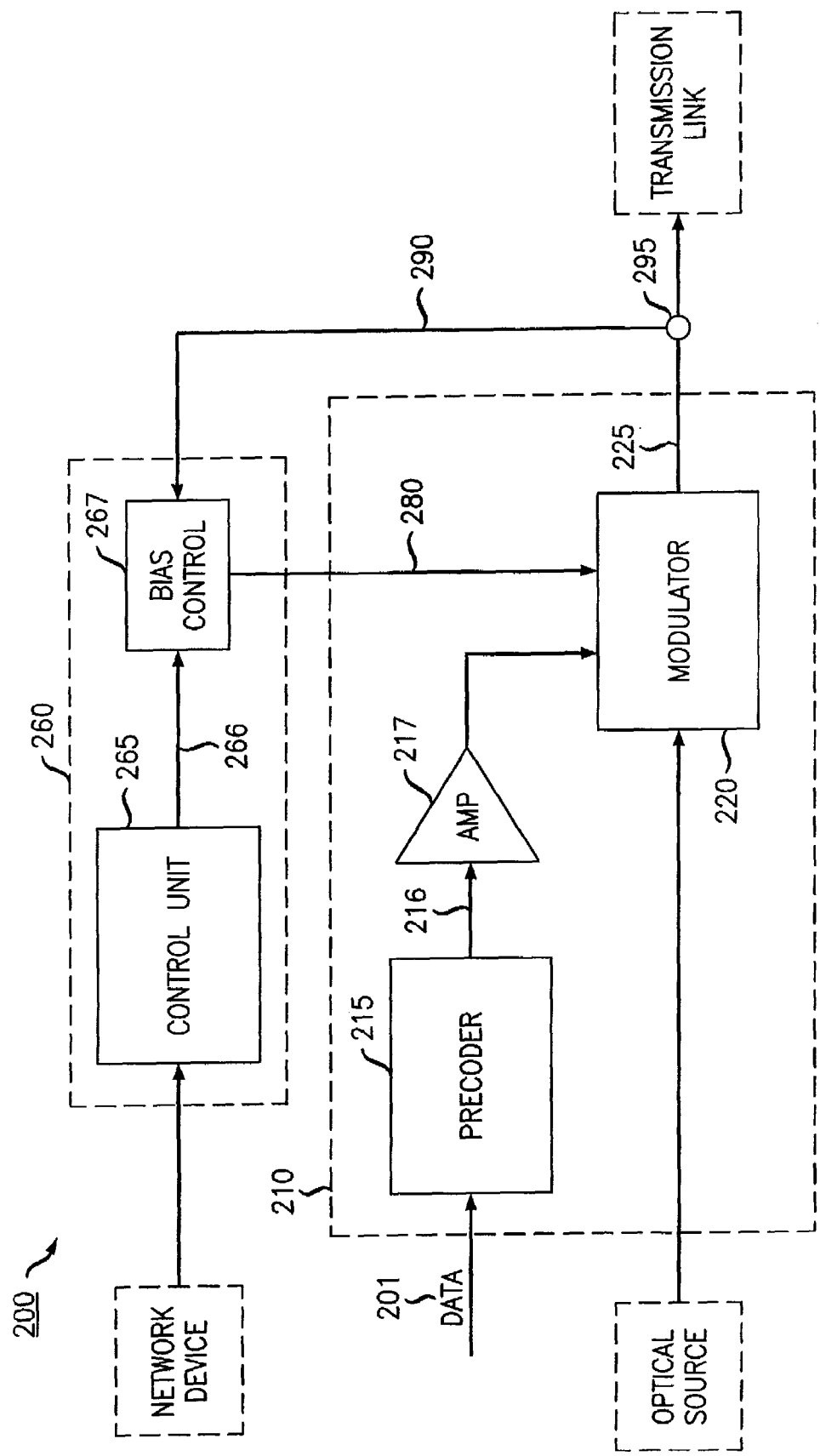
FIG. 2 is a schematic diagram of one embodiment of an apparatus for transmitting optical signals according to the invention.

In one preferred embodiment of the invention, shown in FIG. 2, an apparatus 200 for transmitting optical signals is provided. The apparatus 200 includes a transmitter 210 and bias control apparatus 260.

The transmitter 210 preferably includes a precoder 215, an amplifier 217 and a modulator 220. The precoder 215 preferably comprises a differential encoder and is used to convert a data signal 201 into a differentially encoded drive signal 216. The drive signal 216 is used to drive the modulator 220 to produce an optical signal 225 for transmission across a transmission link.

The modulator 220 is preferably a Mach-Zehnder modulator arranged to encode the data from the drive signal 216 onto light from an optical source to generate the optical signal 225.

The amplifier 217 is preferably an RF amplifier and is provided to amplify the drive signal 216 prior to driving the modulator 220. The amplifier 217 is needed only if the power output from the precoder 215 is not sufficient to drive the modulator 220. The amplifier 217 can be removed entirely from the transmitter 210 architecture if the power of the drive signal 216 output from the precoder 215 is sufficient to drive the modulator 220.

A low-pass filter (not shown) may be included in the transmitter 210 to provide low-pass filtering of the drive signal 216 to generate low-pass filtered duobinary and inverse-data signals. Alternatively, the modulator 220 may be selected such that the modulator 220 limits the frequency response of the transmitter 210 and provides the low-pass filtering for generation of optical duobinary and inverse-data signals.

A bias control apparatus 260 is coupled to the transmitter 210 to control the bias of the modulator 220. The bias control apparatus 260 preferably includes a control unit 265 and a bias control 267. The control unit 265 receives information from a network device (e.g. a network controller) such as information regarding the data rate of the transmitter, the transmission link and/or the chromatic dispersion of the transmission link on which the optical signal 225 is to be transmitted. (Chromatic dispersion of a transmission link, as used herein, refers to the chromatic dispersion accumulated in a transmission link between a transmitter and a receiver.) The control unit 265 uses the information from the network device to determine whether to vary the bias of the modulator 220 so that a duobinary or inverse-data signal is generated. Based on this determination, the control unit 265 then generates a control signal 266 for controlling the bias control 267.

The bias control 267 is coupled to the control unit 265 and the modulator 220 to control the bias of the modulator 220 based on the control signal 266. Specifically, the bias control 267 receives the control signal 266 from the control unit 265 and generates a bias voltage 280 that is applied to one arm of the modulator 220 to set, through an electro-optical effect, the optical phase difference between the two waves traveling in the arms of the modulator 220. This allows for switching the generated optical signal 225 output from the modulator 220 between a duobinary signal and an inverse-data signal. Specifically, the bias condition for generating a duobinary signal is achieved by applying a bias voltage 280 that biases the modulator 220 at null. The bias condition for generating an inverse-data signal is achieved by applying a bias voltage 280 that biases the modulator 220 at peak. The bias voltages for null and peak bias conditions differ by $V_\pi$.

Preferably, the bias control 267 also receives a power monitoring signal 290 from a detector 295 which detects the power of the generated optical signal 225. The bias control 267 can then vary the bias voltage signal 280 to maintain a desired bias condition (i.e. null or peak bias) of the modulator 220 based on feedback from the power monitoring signal 290. Those skilled in the art can appreciate that an appropriate bias control algorithm will be used by the bias control 267 to maintain the desired bias condition.

It will be appreciated by those skilled in the art that various arrangements can be used to practice the invention, such as, where the bias control 267 is integrated within the transmitter 210, or where the bias control 267 and the detector 295 are integrated with the modulator 220, etc.

Figure 3:
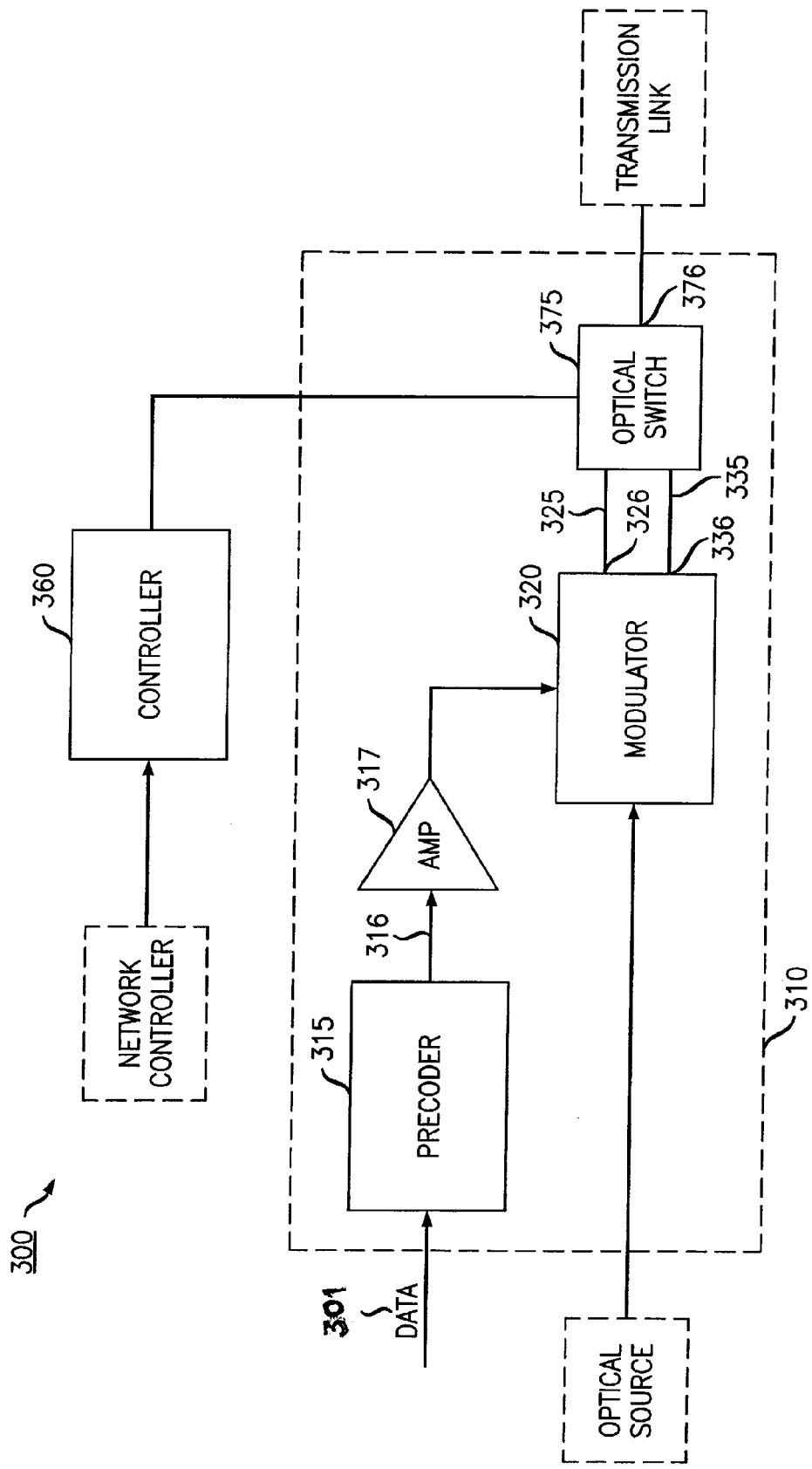
FIG. 3 is a schematic diagram of another embodiment of an apparatus for transmitting optical signals according to the invention.
Figure 4:
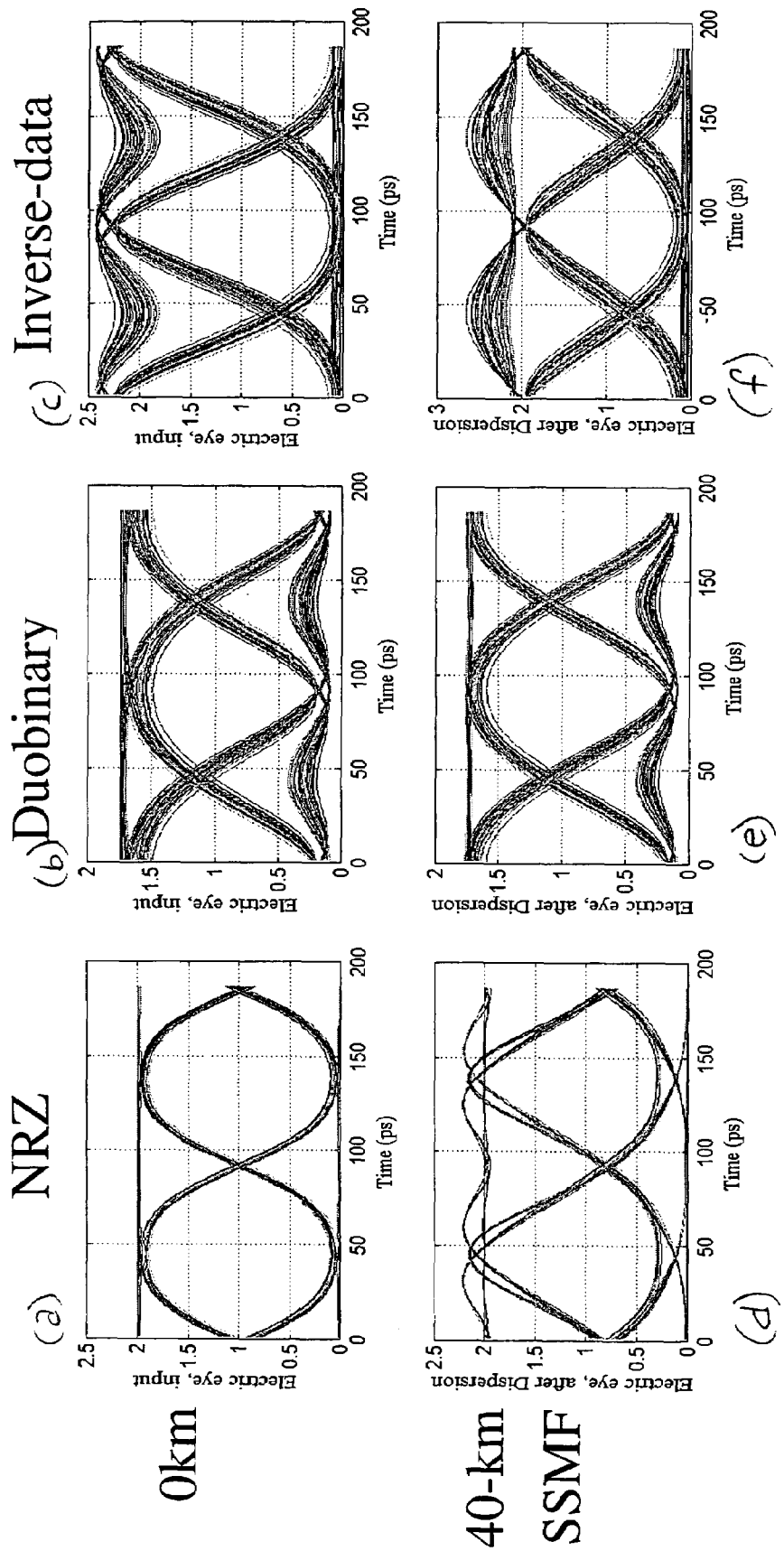
FIGS. 4a-f show eye diagrams from a simulation comparing performance of non-return-to-zero (NRZ) signal transmission, duobinary signal transmission, and inverse-data signal transmission, at 0 km and 40 km.

In another embodiment of the invention, shown in FIG. 3, an apparatus for transmitting optical signals 300 across a transmission link is provided. The apparatus 300 includes a transmitter 310 and a controller 360. The transmitter 310 preferably includes a precoder 315, an amplifier 317, a modulator 320 and an optical switch 375. The precoder 315 preferably comprises a differential encoder and is used to convert a data signal 301 into a differentially encoded drive signal 316. The drive signal 316 is used to drive the modulator 320.

The modulator 320 is preferably a dual output Mach-Zehnder modulator arranged to encode the data from the drive signal 316 onto light from an optical source and generate two complementary outputs: 1) an duobinary signal 325 at a data output port 326, and 2) an inverse-data signal 335 at an inverse-data output port 336.

The optical switch 375 is coupled to the data output port 326 and the inverse-data output port 336 of the modulator 320, and has an output port 376. The controller 360 controls the optical switch 375 to switch between transmission of the duobinary signal 325 and transmission of the inverse-data signal 335 through the output port 376 of the optical switch 375 to the transmission link.

The controller 360 controls the operation of the of the optical switch 375 based on information received from a network device (e.g. a network controller) such as information regarding the data rate of the transmitter, the transmission link and/or the chromatic dispersion of the transmission link on which either the duobinary signal 325 or the inverse-data signal 335 is to be transmitted. Specifically, the controller 360 determines whether the duobinary signal 325 or the inverse-data signal 335 should be transmitted across the transmission link based on the information received from the network device to substantially optimize transmission performance.

The amplifier 317 is preferably an RF amplifier and is provided to amplify the drive signal 316 prior to driving the modulator 320. The amplifier 317 is needed only if the power output from the precoder 315 is not sufficient to drive the modulator 320. The amplifier 317 can be removed entirely from the transmitter 310 architecture if the power of the drive signal 316 output from the precoder 315 is sufficient to drive the modulator 320.

A low-pass filter (not shown) may be included in the transmitter 310 to provide low-pass filtering of the drive signal 316 to generate low-pass filtered duobinary and inverse-data signals. Alternatively, the modulator 320 may be selected such that the modulator 320 limits the frequency response of the transmitter 310 and provides low-pass filtering for generation of optical signals.

FIGS. 4*a-f* show eye diagrams from a simulation that was performed to compare non-return-to-zero (NRZ) signal transmission, duobinary signal transmission, and inverse-data signal transmission, at 0 km and 40 km. The simulation modeled a 10 Gb/s optical transmission apparatus having a Mach-Zehnder modulator in accordance with one embodiment of the invention. It is understood, however, that the present invention can be generally applied to optical transmission apparatus for transmission at various bit rates (e.g. 40 Gb/s) by proportionally scaling the bandwidth of the modulator in the transmitter and the bandwidth of the low-pass filter (the bandwidth of the low-pass filter is preferably about ¼ of the bit rate).

Referring again to FIGS. 4*a-f*, those skilled in the art can appreciate that with zero or low chromatic dispersion an inverse-data signal has as wide or wider eye openings near the 0-level (i.e. performs as well or better) than NRZ or duobinary signals in ASE noise-limited cases.

At 0 km (i.e. back-to-back transmission or transmission over a link with zero dispersion (D=0)), the OSNR required for a bit error rate of 1E−3 is ~10 dB for NRZ signals, ~13 dB for a duobinary (non-inverted) signals, and ~10 dB for inverse-data signals.

For transmission over 40 km of standard single mode fiber (SSMF) (corresponding to a chromatic dispersion (D) value of ~680 ps/nm) the OSNR required for a bit error rate of 1E−3 is ~12.5 dB for NRZ signals, ~12 dB for a duobinary (non-inverted) signals, and ~12 dB for inverse-data signals. Thus, transmission performance can be improved by up to about 3 dB by using inverse-data signals when the chromatic dispersion of a transmission link is low (i.e. below a dispersion threshold of about 700 ps/nm).

The decision to switch between the transmission of a duobinary signal and an inverse-data signal can thus be made by comparing the transmission link dispersion, $D_{link}$, and a dispersion threshold $$D_{th} = 700 \text{ ps/nm} \cdot \left(\frac{10 \text{ Gb/s}}{BR}\right)^2,$$

where BR is the signal bit-rate. When $D_{link} > D_{th}$, the duobinary signal is selected for transmission; otherwise, the inverse-data signal is selected.

As discussed above, it has also been found that, by selecting either the duobinary signal or the inverse-data signal (based on the chromatic dispersion of the transmission link), a higher tolerance to timing jitter in the drive signal, PMD, narrow optical filtering, and nonlinear penalties such as self-phase modulation (SPM) and cross-phase modulation (XPM) can be achieved. One reason for the improved tolerance is that the duobinary and inverse-data signals have a wider 0-level (above and below the dispersion threshold, respectively) and are thus more immune to inter-symbol interference.

Figure 5:
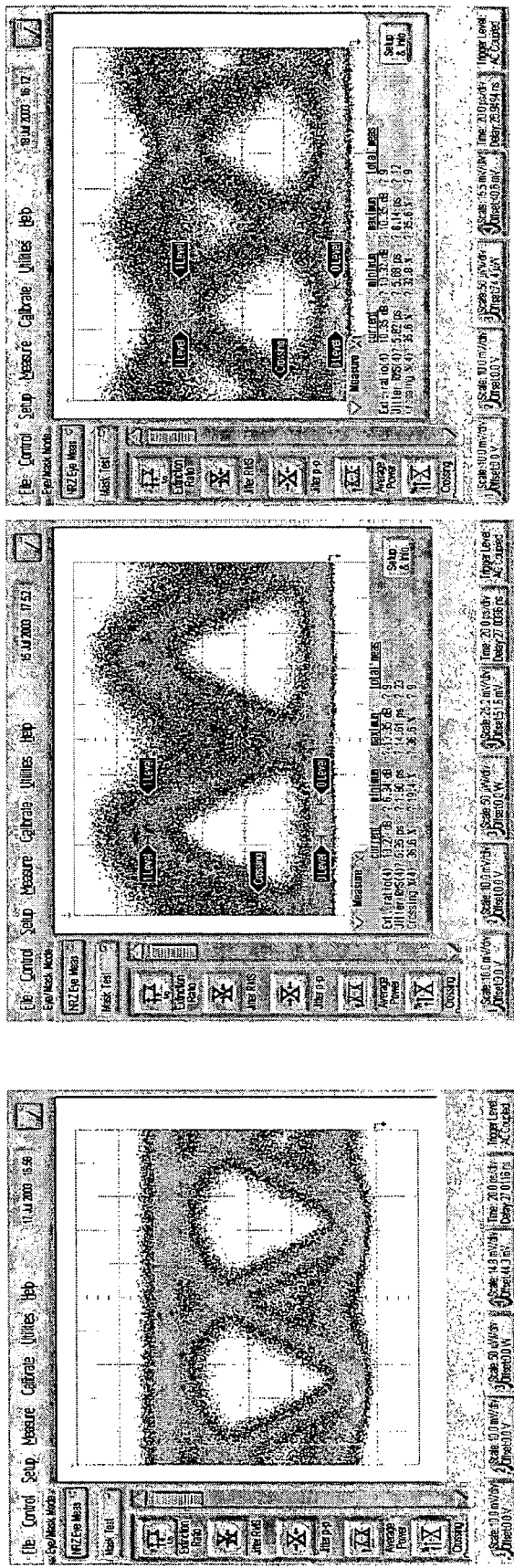
FIGS. 5a-c show eye diagrams from an experiment comparing performance of duobinary and inverse-data signal transmission over 0 km, and inverse-data signal transmission after 40 km.
Figure 6:
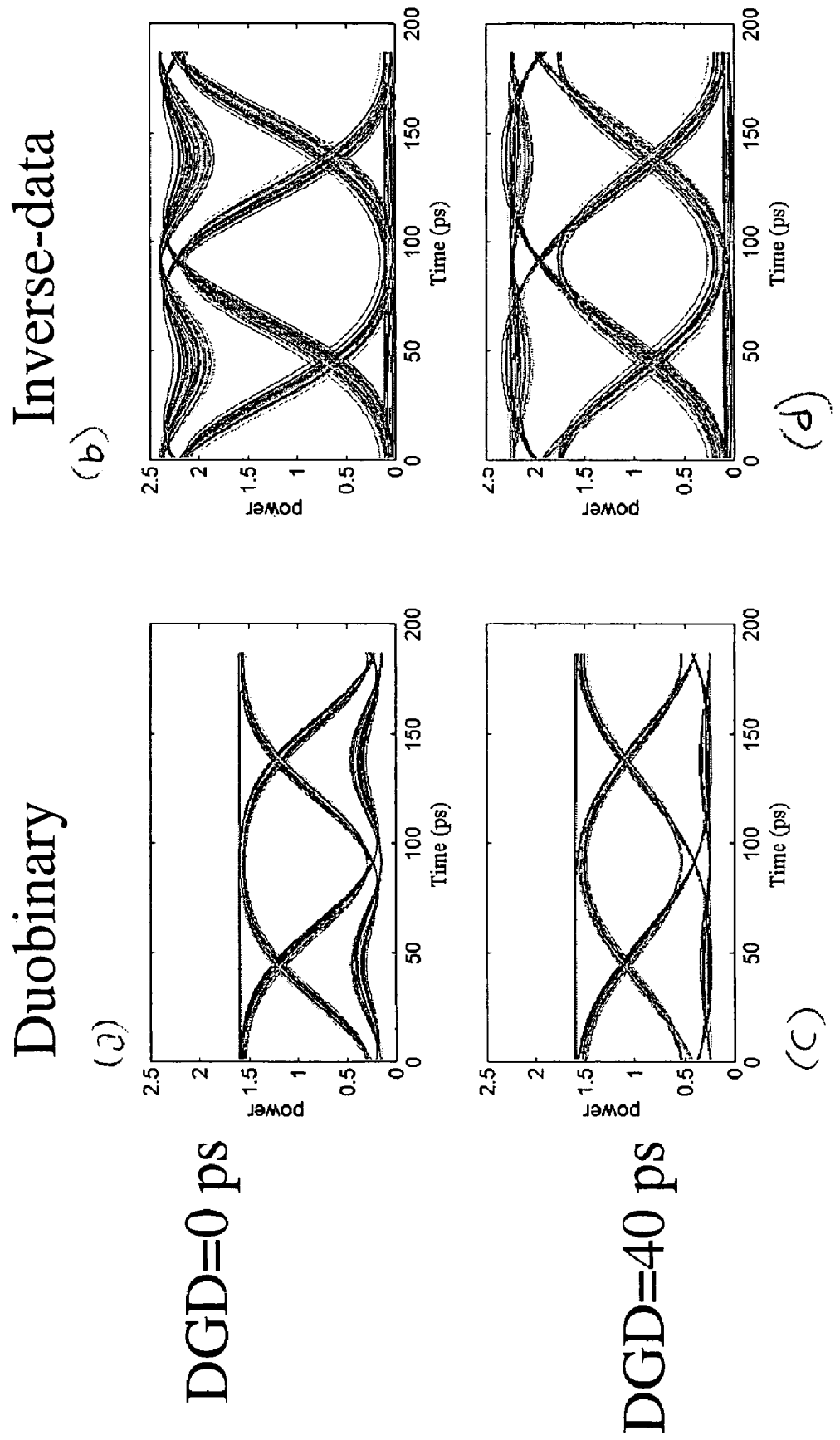
FIGS. 6a-d show eye diagrams from a simulation comparing polarization mode dispersion tolerance for duobinary and inverse-data signal transmission.

FIGS. 5a-c show eye diagrams from an experiment performed to compare the performance of duobinary and inverse-data signal transmission over 0 km, and inverse-data signal transmission after 40 km, where significant timing jitter of the modulator drive signal is present. As can be understood by those skilled in the art, the inverse-data signal (after transmission through 0 km and 40 km of SSMF at 10 Gb/s) has wider eye opening (at the decision level which is near the 0-level) and thus better performance than the duobinary signal.

FIGS. 6a-d show eye diagrams from another simulation performed to compare the polarization mode dispersion tolerance for duobinary and inverse-data signal transmission with zero chromatic dispersion and differential group delays (DGDs) of 0 ps and 40 ps. From the simulation it was found that the OSNR penalty for the inverse-data signal transmission is less than about 1.5 dB with a DGD of 40 ps in a 10.7 Gb/s system, which is more than 1 dB less than that for duobinary signal transmission. Thus, the inverse-data signal has better PMD tolerance when transmitted across transmission links with no chromatic dispersion. It can be understood by those skilled in the art that in transmission links with higher chromatic dispersion (i.e. $D_{link} > D_{th}$) the PMD tolerance of duobinary signals is better than that of inverse-data signals.

Figure 7:
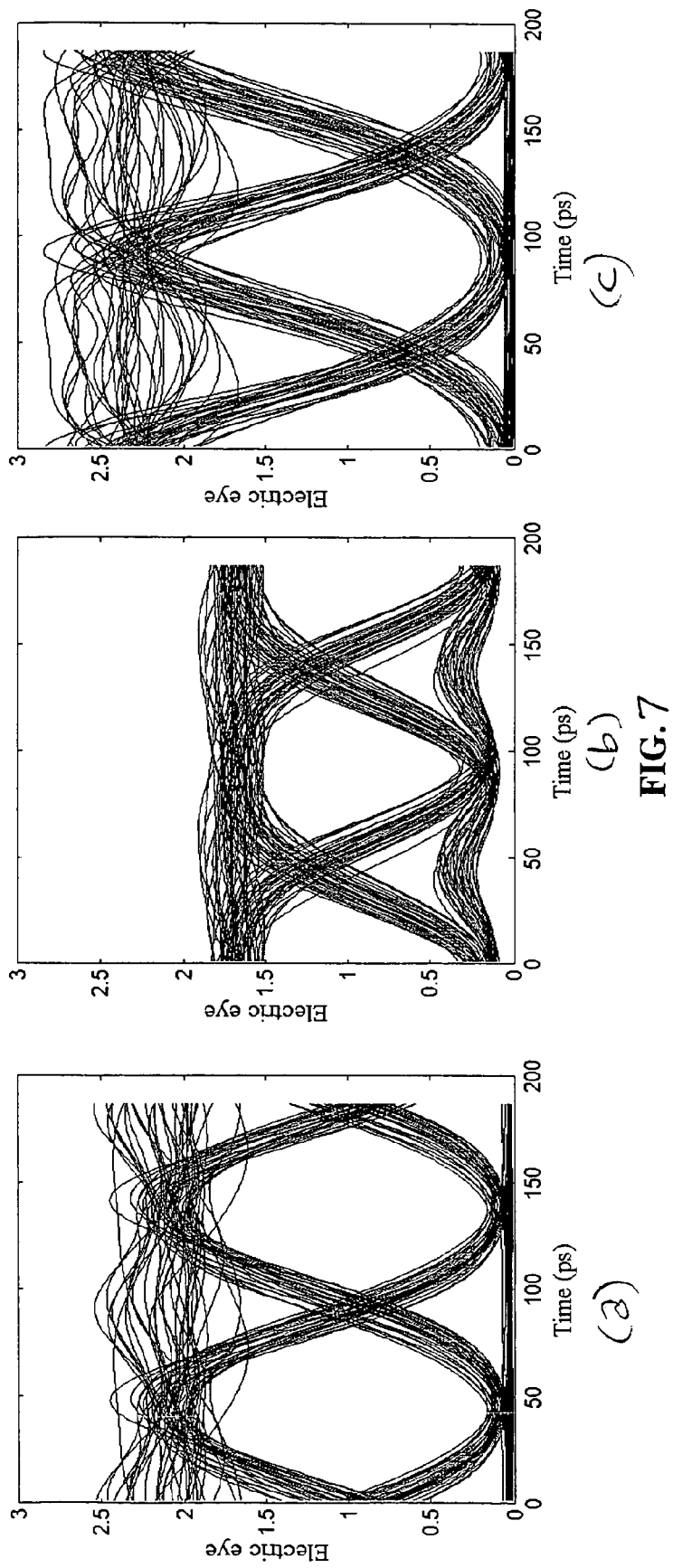
FIGS. 7a-c show eye diagrams from a simulation comparing nonlinearity tolerance for NRZ, duobinary, and inverse-data signal transmission.

FIGS. 7a-c show eye diagrams from a simulation performed to compare the nonlinearity tolerance for NRZ, duobinary and inverse-data signal transmission over a long-distance link (i.e. 2000 km) having low chromatic dispersion but large nonlinear effects such as SPM and XPM. Those skilled in the art will appreciate from FIGS. 7a-c that the inverse-data signal transmission has better nonlinear tolerance compared to both NRZ and duobinary signal transmission because of its widened 0-level.

The present invention can be implemented using transmitter apparatus and other components comprising discrete components or integrated modules (e.g. transmitters having laser/modulator modules, duobinary driver/modulator modules, laser/duobinary driver/modulator modules, and the like).

Although the invention has been described with reference to illustrative embodiments, this description should not be construed in a limiting sense. Various modifications of the described embodiments, as well as other embodiments of the invention, which are apparent to persons skilled in the art to which the invention pertains, are deemed to lie within the principle and scope of the invention as expressed in the following claims.

What is claimed is:

1. A method for transmitting optical signals across a transmission link comprising the steps of:
   generating in an optical modulator, the optical signals based upon the chromatic dispersion of the transmission link, wherein the generated optical signals are duobinary signals if the chromatic dispersion of the transmission link is above a predetermined dispersion threshold $D_{th}$, else inverse-data signals if the chromatic dispersion of the transmission link is below the predetermined dispersion threshold $D_{th}$; and
   transmitting the generated optical signals across the transmission link,
   wherein $D_{th}$ is determined according to the following relationship, $$D_{th} = 700 \frac{\text{ps}}{\text{nm}} \left(\frac{10 \text{ Gb/s}}{BR}\right)^2,$$

and BR is the bit-rate of the transmitted optical signals.

2. A method for generating optical signals for transmission across a transmission link comprising the steps of:
   driving an optical modulator to generate the optical signals based upon the chromatic dispersion of the transmission link, wherein the driving step farther includes the steps of;
   controlling the bias of the modulator based on the chromatic dispersion of the transmission link, such that the modulator is biased at peak if the chromatic dispersion of the transmission link is below a predetermined dispersion threshold $D_{th}$, else the modulator is biased at a null if the chromatic dispersion of the transmission link is above the predetermined dispersion threshold $D_{th}$; and
   generating an inverse-data signal waveform if the modulator is biased at the peak, else generating a duobinary signal waveform if the modulator is biased at the null,
   wherein $D_{th}$ is determined according to the following relationship, $$D_{th} = 700 \frac{\text{ps}}{\text{nm}} \left(\frac{10 \text{ Gb/s}}{BR}\right)^2,$$

and BR is the bit-rate of the transmitted optical signals.

3. A method for generating optical signals for transmission across transmission link comprising:

driving a dual output modulator to generate duobinary signals at a first output port and inverse-data signals at a second output port; and controlling an optical switch coupled to the modulator based upon the chromatic dispersion of the transmission link to select between transmitting the duobinary signals from the first output port across the transmission link and transmitting the inverse-data signals from the second output port across the transmission link.

4. An apparatus for transmitting optical signals across a transmission link comprising:

an optical modulator for generating optical signals based upon the chromatic dispersion of the transmission link; and a bias control apparatus for controlling the bias of the modulator based upon the chromatic dispersion of the transmission link, such that the waveform of the generated optical signals has a duobinary signal waveform if the chromatic dispersion of the transmission link is above a predetermined dispersion threshold $D_{th}$, else has an inverse-data signal waveform if the chromatic dispersion of the transmission link is below the predetermined dispersion threshold $D_{th}$, wherein $D_{th}$ is determined according to the following relationship, $$D_{th} = 700 \; \frac{\text{ps}}{\text{nm}} \left( \frac{10 \text{ Gb/s}}{BR} \right)^2,$$

and BR is the bit-rate of the transmitted optical signals.

5. The apparatus of claim 4 wherein the bias control apparatus includes:

a control unit for generating a bias control signal based on the chromatic dispersion of the transmission link; and a bias control coupled to the control unit and the modulator such that based on the bias control signal generated by the control unit, the bias control apparatus sets the bias of the modulator to null if the chromatic dispersion of the transmission link is above a predetermined dispersion threshold $D_{th}$, else to peak if the chromatic dispersion of the transmission link is below the predetermined dispersion threshold $D_{th}$.

6. An apparatus for transmitting optical signals across a transmission link comprising:

an optical modulator for generating duobinary signals at a data output port and inverse-data signals at an inverse-data output port;

an optical switch coupled to the data and inverse-data output ports of the modulator for selecting between transmission of the duobinary signals from the data output port and transmission of the inverse-data signals from the inverse-data output port; and a controller for controlling the optical switch based upon the chromatic dispersion of the transmission link.

7. An apparatus for transmitting optical signals across a transmission link comprising:

means for generating optical signals based upon the chromatic dispersion of the transmission link, wherein the generated optical signals are optical duobinary signals if the chromatic dispersion of the transmission link is above a predetermined dispersion threshold $D_{th}$, else optical inverse-data signals if the chromatic dispersion of the transmission link is below the predetermined dispersion threshold $D_{th}$; and means for transmitting the generated optical signals across the transmission link wherein $D_{th}$ is determined according to the following relationship, $$D_{th} = 700 \; \frac{\text{ps}}{\text{nm}} \left( \frac{10 \text{ Gb/s}}{BR} \right)^2,$$

and BR is the bit-rate of the transmitted optical signals.

* * * * *